United States Patent [19]

Penick

[11] 4,150,637

[45] Apr. 24, 1979

[54] ULTRASONIC DEVICE FOR SCARING ANIMALS FROM A MOVING VEHICLE

[76] Inventor: Monroe Penick, 509 St. John's Dr., Sherman, Ill. 62684

[21] Appl. No.: 849,190

[22] Filed: Nov. 7, 1977

Related U.S. Application Data

[63] Continuation-in-part of Ser. No. 703,946, Jul. 9, 1976, abandoned.

[51] Int. Cl.² ............................................. B60Q 5/00
[52] U.S. Cl. ................................ 116/58 R; 180/1 R; 280/727; 296/1 R
[58] Field of Search ............... 116/137 A, 138, 22 R, 116/22 A, 28 R, 56, 58 R; 296/91.1 R, 1 R; 180/1 R, 1 FV; 280/727; 296/1 R

[56] References Cited

U.S. PATENT DOCUMENTS

| 1,342,584 | 6/1920 | Bull | 116/22 R |
|---|---|---|---|
| 1,796,826 | 3/1931 | Buckert | 116/138 |
| 2,238,668 | 4/1941 | Wellenstein | 116/137 A |
| 2,245,484 | 6/1941 | Leavens | 116/137 A |
| 2,570,081 | 10/1951 | Szczeniowski | 116/137 A |
| 3,156,212 | 11/1964 | Buell, Jr. | 116/137 A |
| 3,157,153 | 11/1964 | Moe | 116/22 A X |
| 3,169,507 | 2/1965 | Rich | 116/137 A |
| 3,276,420 | 10/1966 | Fresolone, Sr. | 116/138 |
| 3,695,679 | 10/1972 | Wilfert | 296/91 |
| 3,972,494 | 8/1976 | Drews | 296/91 X |

FOREIGN PATENT DOCUMENTS

| 560617 | 4/1975 | Switzerland | 180/1 R |
|---|---|---|---|
| 6092 of | 1903 | United Kingdom | 180/1 R |

*Primary Examiner*—Daniel M. Yasich
*Attorney, Agent, or Firm*—Ralph F. Staubly

[57] ABSTRACT

An air scoop is positioned to receive and compress air in response to movement of a vehicle or its radiator-cooling fan. The compressed air is conducted to a whistle for producing sound at a frequency somewhat above human hearing range. The whistle is preferably provided with a dished reflector for forwardly beaming the sound. The reflector can optionally also be the air scoop.

6 Claims, 3 Drawing Figures

ULTRASONIC DEVICE FOR SCARING ANIMALS FROM A MOVING VEHICLE

This application is a continuation-in-part of Ser. No. 703,946 filed July 9, 1976, now abandoned.

BACKGROUND AND OBJECTS OF THE INVENTION

It is known to employ ultrasonic sound to drive pests away from selected areas (e.g. Quittner U.S. Pat. No. 3,138,138). It is also known to employ air scoops on moving vehicles to energize horns for warning persons of the approach of the vehicle. However, it is not known to provide a vehicle-mounted scoop-energized ultrasonic device that can be continually operated, without human annoyance, for scaring birds and/or animals away from the path of the moving vehicle. It is accordingly the object of the present invention to provide an accessory of this type which is of simple and inexpensive yet highly effective construction.

DETAILED DESCRIPTION

Figure 1:
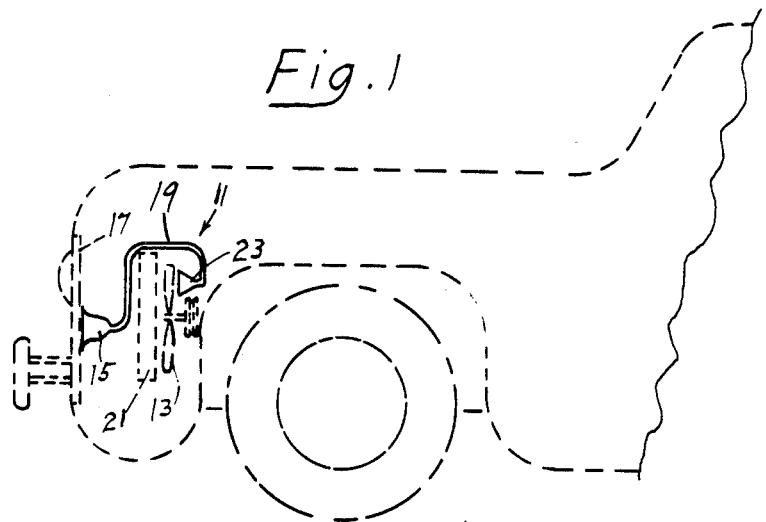
FIG. 1 is a side elevational view of one embodiment of the invention.

With reference to FIG. 1 of the drawings, the numeral 11 generally designates a fan-operated form of the invention. (The radiator-cooling fan 13 and other automobile parts are shown in phantom.) The accessory 11 comprises a whistle-type sound projector 15 here shown mounted to or near the rear face of the grill 17. The sound projector 15 can be of the form shown in the lower half of FIG. 2 and described in detail hereinafter. The sound projector is connected by a flexible hose 19, which passes around the radiator 21, to the air outlet nipple of the air scoop 23. The air scoop 23 is mounted behind and close to the fan 13. This arrangement desirably provides pulsed sound blasts and further insures sound production even when the air speed of the vehicle is ineffectively low (e.g. from a strong tail wind). The scoop 23 can take the form of the one shown in the upper half of FIG. 2 next to be described.

Figure 2:
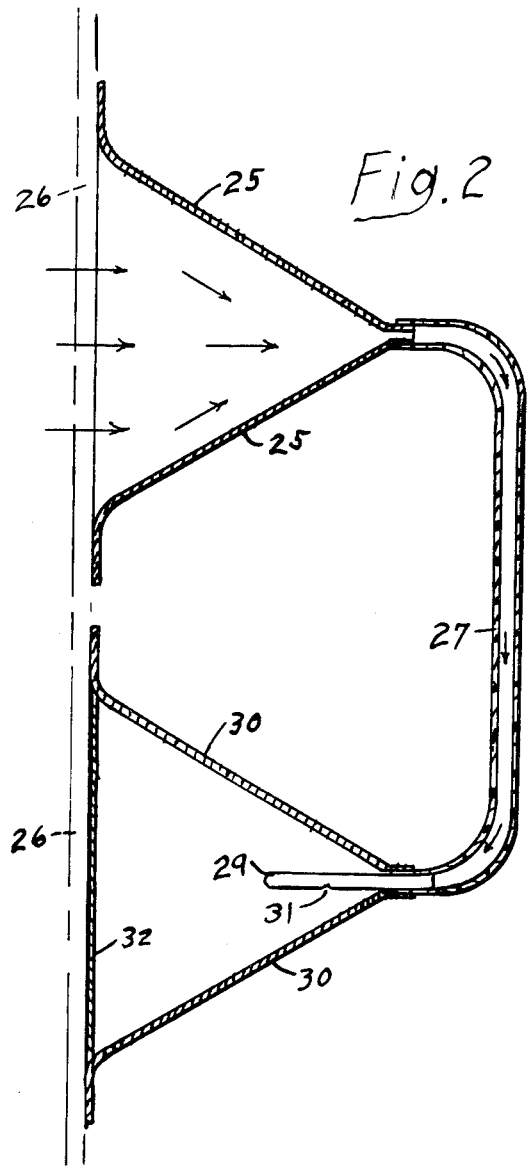
FIG. 2 is a side elevational view of a second species in vertical medial section.

In FIG. 2 a conical air scoop 25 is mounted to the car grill 26. A flexible hose 27 connects the scoop to a dog-type whistle 29 mounted in a conical reflector 30. The sound-emitting aperture 31 of the whistle 29 is located close to what would be the focus of the reflector 30 if it were of paraboloidal shape (as in FIG. 3). The aperture 31 is also downwardly open so as to prevent entrance of water or other foreign matter, and so as to provide drainage of any water that may enter the air scoop and hose. Part 32 is an air-excluding but sound-transmitting flexible membrane. A small (approximately wall-thickness-diameter) air-outlet and water-drainage aperture (numeral omitted) is provided in the lowest part of the conical portion of the reflector 30 where it joins the vertical flanged portion of the reflector.

Figure 3:
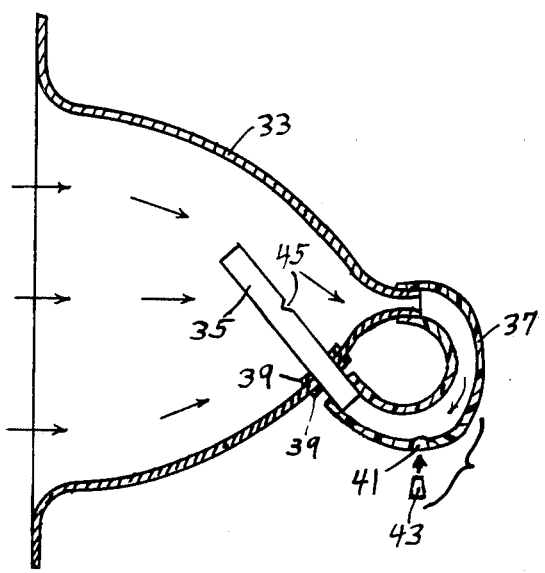
FIG. 3 is a side elevational view of the third species in axial section.

In FIG. 3 the paraboloidal reflector 33 is also the air scoop, which scoop is connected to the dog-type whistle 35 by a flexible hose 37. The whistle 35 is held in place by threaded or cemented nuts or washers 39. A drain aperture 41 is shown in the lower reach of the hose 37. The aperture 41 may be left open or be closable by a press-fitted plug 43. The sound-emitting opening 45 of the whistle 35 is located close to the focal point of the reflector 33. To reduce air pressure adjacent the whistle air-discharge opening 45, and thus to insure ample sound generation, there may be provided an aperture (of at least whistle-diameter size) in the reflector 33 directly opposite the opening 45.

The invention having been described, what is claimed as being patentable is:

1. An accessory for a moving vehicle for scaring birds and/or animals away from the path of movement of said vehicle, said accessory comprising: an air scoop adapted to be fixed to said vehicle and positioned for collecting and speedwise proportionately compressing air in response to operation of said vehicle, whistle means connected to means constructed to forwardly emit sound at a frequency that is substantially above the audible range of the human ear, and means including a tube for operatively connecting said air scoop to said whistle means for continual sound emission therefrom and speedwise volumetrically in response to said operation of said vehicle.

2. Structure according to claim 1, said whistle means comprising a whistle and said sound emitting means being a dished sound reflector connected to and positioned around and behind said whistle.

3. Structure according to claim 2, said air scoop and said reflector being the same element.

4. Structure according to claim 2, said air scoop being adapted for mounting behind the radiator fan of said vehicle for insuring operation of said pneumatic means when vehicle air-speed is low and/or for producing pulsed sound-emission.

5. Structure according to claim 2, said sound reflector having its open face covered by a flexible membrane for preventing its acting as an air scoop and producing sound-reducing back air-pressure, and for preventing whistle-clogging foreign matter from entering said reflector.

6. Structure according to claim 2, said sound reflector being paraboloidal and the sound-emitting aperture of said whistle being located close to the focal point of said reflector.

* * * * *